Dec. 4, 1934.   W. R. GRISWOLD   1,982,658
RUBBER MOUNTED FLYWHEEL
Filed Dec. 22, 1931
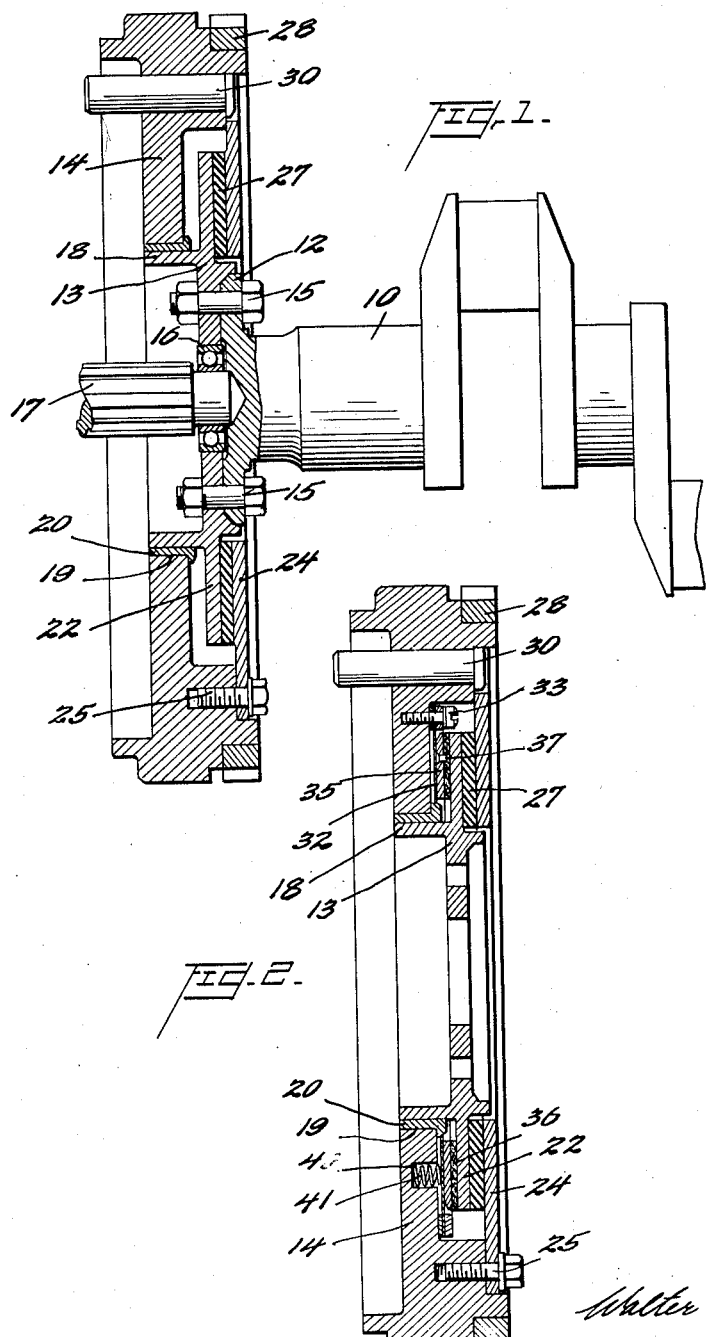

Patented Dec. 4, 1934

1,982,658

UNITED STATES PATENT OFFICE 1,982,658

RUBBER MOUNTED FLYWHEEL

Walter R. Griswold, Detroit, Mich., assignor to Packard Motor Car Company, Detroit, Mich., a corporation of Michigan Application December 22, 1931, Serial No. 582,591

9 Claims. (Cl. 74—6)

This invention relates to means for damping vibrations induced in the crankshafts of internal combustion engines and is particularly concerned with that type of damper employing a freely rotatable member having appreciable inertia and energy absorbing means drivingly connecting the inertia member to the crankshaft.

It is the primary object of the invention to provide a damper of this character which is simple and inexpensive to construct and which may be readily assembled and disassembled. It is a feature of the invention that the inertia member may constitute the principal flywheel mass for the crankshaft, the construction being such as to insure accurate centering of the flywheel on the crankshaft axis, the parts which connect the flywheel to the shaft serving also to prevent longitudinal displacement of the flywheel in the direction of the crankshaft axis.

Further objects and features of the invention will be apparent from the following description taken in connection with the accompanying drawing, in which:

Figure 1 is a longitudinal sectional view of a crankshaft and vibration damper embodying the principles of the invention; and Figure 2 is a similar view of a slightly modified form of vibration damper.

In order to facilitate an understanding of the invention, the embodiments of the invention shown in the drawing for the purpose of illustrating the principles thereof are described in specific language hereinafter. It will nevertheless be understood that various changes and alterations may be made in the constructions disclosed without departing from the spirit of the invention.

Referring now to Figure 1 of the drawing, it will be observed that the crankshaft 10 is provided at one end thereof with an annular flange 12, a supporting member 13 being secured to the latter by means of bolts 15. The member 13 is provided with a bearing portion 16 which serves to journal the shaft 17 driven from the crankshaft.

An inertia member 14, preferably constituting the main flywheel for the shaft, is rotatably mounted on the supporting member 13, the latter being provided for this purpose with an axially extending, substantially cylindrical bearing portion 18 which is received within the central opening 19 of the inertia member. A bushing 20 forming a bearing is preferably pressed within the opening 19.

The member 13 is further provided with a radially extending annular flange portion 22, and a corresponding flange portion 24 is provided on the inertia member, the flange portion 24 preferably comprising an annular element secured by means of bolts 25 to the rim of the inertia member. An annular disk 27 of deformable material is interposed between and secured to the opposing faces of the flange portions 22 and 24 carried by the crankshaft and inertia member respectively. This disk is preferably of rubber and is secured to the cooperating elements by vulcanizing. A toothed annulus 28 may be secured to the inertia member 14 by being shrunk on the rim portion thereof, this annulus serving to drive a generator or other equipment, and the inertia member may be further provided with pins 30 for coupling the inertia member to one element of a friction clutch (not shown) located on the driven shaft 17 and arranged to drivingly connect the driven shaft and the crankshaft.

It will be understood that this construction provides for the driving of the inertia member through the deformable member 27, and by reason of the yieldable nature of this connection, the crankshaft will be permitted to oscillate to a slight extent with respect to the inertia member during operation of the engine in response to vibrations induced in the crankshaft. When the member 27 is formed of rubber or similar material characterized by imperfect elasticity, this relative motion of the crankshaft and flywheel will result in the deformation of the member 27 and the consequent production of heat therein by internal friction, and thus the energy of vibration of the crankshaft will be absorbed and dissipated. It will be observed that the inertia member is retained against longitudinal displacement axially of the crankshaft by the cooperating elements 22, 24, and 27 which serve to connect the inertia member to the crankshaft, and that removal of the inertia member may be readily effected by withdrawal of the bolts 25 and the annular flange member 24. The construction is such that the member 27 is readily accessible for repair or replacement and the supporting and driving means for the inertia member 14 consisting of the members 13, 24, and 27 may be constructed as a unit separately from the inertia member.

It is sometimes found desirable to provide additional energy absorbing means in the form of a friction connection between the crankshaft and the inertia member, since the internal friction of the yieldable connection is frequently insufficient to completely dissipate the energy of vibration and to prevent the building up of this energy to serious proportions at the critical speeds of the engine. An arrangement suitable for this purpose is shown in Figure 2 of the drawing, it being noted that the construction is quite similar to that shown in Figure 1, with the exception of the features about to be described.

A thin flexible plate 32, preferably formed of steel, is secured adjacent the periphery thereof to the inertia member by means of bolts 33, an annular metal disk 35 being in turn secured to the plate 32 by spot welding. A friction disk 36 is riveted as at 37 to the disk 35 for engagement with the flange portion 22 of the member 13. Recesses 40 are provided in the inertia member 14, coiled springs 41 being seated in these recesses and bearing against the rear face of the plate 32 to flex the plate axially of the crankshaft and thus increase the pressure between the friction disk 36 and the flange portion 22 of member 13.

It will be observed that both forms of the invention described herein are characterized by extreme simplicity, and that the damper may be readily substituted for the usual flywheel without alteration of the conventional crankshaft and associated parts.

Having thus described the invention, what is claimed as new and desired to be secured by Letters Patent is:

1. In a vibration damper for crankshafts, the combination with an inertia member having a central opening therethrough, of a member adapted to be secured to the crankshaft and provided with an axially extending substantially cylindrical bearing portion fitting within the opening in said inertia member and serving to journal the latter thereon, said members being provided with radially extending annular flange portions having opposed faces located in close proximity, an annular element of deformable material secured to the opposed faces of said flange portions to yieldably couple the said members, means for frictionally connecting said members, and means acting with said friction means to apply pressure to the latter for increasing the friction developed thereby.

2. In a vibration damper for crankshafts, the combination with an inertia member having a central opening therethrough, of a member adapted to be secured to the crankshaft and provided with an axially extending substantially cylindrical bearing portion fitting within the opening in said inertia member and serving to journal the latter thereon, said members being provided with radially extending annular flange portions having opposed faces located in close proximity, an annular element of deformable material secured to the opposed faces of said flange portions to yieldably couple the said members, and means for frictionally connecting said members, said means comprising an annular disc secured to one of said members and provided with a friction facing engaging the other of said members.

3. In a vibration damper for crankshafts, the combination with an inertia member having a central opening therethrough, of a member adapted to be secured to the crankshaft and provided with an axially extending substantially cylindrical bearing portion fitting within the opening in said inertia member and serving to journal the latter thereon, said members being provided with radially extending annular flange portions having opposed faces located in close proximity, an annular element of deformable material secured to the opposed faces of said flange portions to yieldably couple the said members, means for frictionally connecting said members, said means comprising an annular flexible disc secured adjacent the outer periphery thereof to one of said members and having a friction facing engaging the other of said members, and resilient means engaging said disc to flex the same axially of the crankshaft to increase the pressure between the frictionally engaging surfaces.

4. In a vibration damper for crankshafts, the combination with an inertia member having a central opening therethrough, of a member adapted to be secured to the crankshaft and provided with an axially extending substantially cylindrical bearing portion fitting within the opening in said inertia member and serving to journal the latter thereon, said members being provided with radially extending annular flange portions having opposed faces located in close proximity, an annular element of deformable material secured to the opposed faces of said flange portions to yieldably couple the said members, and means for frictionally connecting said members, said means comprising friction means secured to said inertia member and engaging the said flange portion of the other member, and means applying pressure to said friction means to increase the friction developed by the latter.

5. In apparatus of the class described, the combination with a crankshaft, of a member secured to said shaft, said member having an axially extending bearing portion, a flywheel journalled on said bearing portion, a radial outwardly extending flange on said member, means including a radial inwardly extending flange on said flywheel disposed in close proximity to one face of said member flange, yielding means developing friction between the opposite face on said member flange and said flywheel, and means including an elastic element operatively connected between said flywheel flange and said member flange.

6. In apparatus of the class described, the combination with a hub member, of a flywheel member journalled on said hub member, an annular flexible disc secured to one of said members, yielding means associated with the member to which the disc is secured for flexing the latter outwardly from the member, the other of said members having a flange portion arranged for engagement by said disc to frictionally connect said members, and means including an elastic element operatively connected between one of said members and the said flange portion on the other of said members.

7. In a vibration damper for crankshafts, the combination with a hub member, of an inertia member supported for oscillatory movement on said hub member, one of said members being formed to provide an annular groove, the other of said members having an annular flange extending within the groove and of less width than the latter to define spaces therebetween on each side of said flange, friction developing means disposed in one of said spaces and acting between said members to resist relative oscillatory movement thereof, and means including an elastic element operatively connected between said members and disposed in the other of said spaces.

8. In a vibration damper for crankshafts, the combination with a hub member, of an inertia member journalled on said hub member for oscillatory movement with respect thereto, one of said members being formed to provide an annular groove, the other of said members having an annular flange extending within the groove and of less width than the latter to define spaces therebetween on each side of said flange, friction developing means disposed in one only of said spaces and acting between said members to resist relative oscillatory movement thereof, and means including an elastic element operatively connected between said members and disposed in the other only of said spaces.

9. In a vibration damper for crankshafts, the combination with a hub member, of an inertia member journalled on said hub member for oscillatory movement with respect thereto, an annular flange secured to said inertia member adjacent the outer portion of the latter and extending inwardly therefrom to provide with the inertia member an annular groove, said hub member having an annular flange extending in the groove and of less width than the latter to define spaces therebetween on each side of said hub flange, friction developing means disposed in one only of said spaces and acting between said members to resist relative oscillatory movement thereof, and means including an elastic element operatively connected between said members and disposed in the other only of said spaces.

WALTER R. GRISWOLD.